(12) United States Patent
Xu (10) Patent No.: US 12,118,348 B2
(45) Date of Patent: Oct. 15, 2024

(54) METHOD AND EQUIPMENT FOR GENERATING A DIFFERENTIAL UPGRADE PACKAGE, AND METHOD FOR UPGRADE

(71) Applicant: Suzhou PanKore Integrated Circuit Technology Co. Ltd., Suzhou (CN)

(72) Inventor: XiaoDan Xu, Suzhou (CN)

(73) Assignee: Suzhou PanKore Integrated Circuit Technology Co., Ltd., Suzhou (CN)

( * ) Notice: Subject to any disclaimer, the term of this patent is extended or adjusted under 35 U.S.C. 154(b) by 0 days.

(21) Appl. No.: 17/563,256

(22) Filed: Dec. 28, 2021

(65) Prior Publication Data
US 2023/0067872 A1    Mar. 2, 2023

(30) Foreign Application Priority Data

Aug. 30, 2021 (CN) .......................... 202111001554.X (51) Int. Cl.
*G06F 8/658* (2018.01)
*G06F 3/06* (2006.01)
*G06F 8/61* (2018.01)

(52) U.S. Cl.
CPC ............ *G06F 8/658* (2018.02); *G06F 3/0604* (2013.01); *G06F 3/0652* (2013.01); *G06F 3/0673* (2013.01); *G06F 8/61* (2013.01)

(58) Field of Classification Search
CPC .......... G06F 8/658; G06F 8/65; G06F 3/0652; G06F 3/0673; G06F 8/61
See application file for complete search history.

(56) References Cited

U.S. PATENT DOCUMENTS

| 7,676,506 B2 | 3/2010 | Reinsch |
| 8,438,558 B1 * | 5/2013 | Adams ................... G06F 8/658 |
| | | 717/170 |

(Continued)

FOREIGN PATENT DOCUMENTS

| CN | 106648765 A | 5/2017 |
| CN | 107273159 A | 10/2017 |

(Continued)

OTHER PUBLICATIONS

"Research and implementation of embedded firmware remote upgrade technology"; University of Electronic Science and Technology of China; Jun. 17, 2011.

(Continued)

*Primary Examiner* — Wei Y Zhen
*Assistant Examiner* — Brahim Bourzik
(74) *Attorney, Agent, or Firm* — McClure, Qualey & Rodack, LLP (57) ABSTRACT

A method for generating a differential upgrade package, adaptable for upgrading a firmware of an embedded system with the differential upgrade package. A differential comparison is performed on an original file and a new file to generate global discrepancy information, comprising addresses and lengths of matched data portions in the new file and the original file. Thereafter, based on the global discrepancy information, the new file is divided into a plurality of blocks, with patch parameters for each of the blocks determined. Based on the patch parameters, a plurality of differential blocks are generated, respectively corresponding to each of the blocks. In the end, the differential upgrade package generation equipment combines the differential blocks into the differential upgrade package, allowing the embedded system to sequentially load each of the differential blocks from the differential upgrade package to (Continued)

upgrade the firmware. A differential upgrade package generation equipment is also provided.

15 Claims, 4 Drawing Sheets

(56) References Cited

U.S. PATENT DOCUMENTS

| | | | |
|---|---|---|---|
| 8,554,748 B1 | 10/2013 | Kamity et al. | |
| 10,509,642 B2* | 12/2019 | Li | G06F 8/658 |
| 2003/0028867 A1* | 2/2003 | Kryloff | G06F 8/658 |
| | | | 717/171 |
| 2004/0031027 A1* | 2/2004 | Hiltgen | G06F 8/65 |
| | | | 717/170 |
| 2007/0294686 A1* | 12/2007 | Oh | G06F 8/658 |
| | | | 717/168 |
| 2014/0250066 A1 | 9/2014 | Calkowski et al. | |
| 2017/0110178 A1 | 4/2017 | Bains | |
| 2018/0307479 A1 | 10/2018 | Subramanian et al. | |
| 2020/0348853 A1* | 11/2020 | Nam | G06F 8/654 |
| 2021/0004223 A1* | 1/2021 | Von Borany | G06F 8/658 |

FOREIGN PATENT DOCUMENTS

| | | |
|---|---|---|
| CN | 108170460 A | 6/2018 |
| CN | 109542497 A | 3/2019 |
| CN | 109992292 A | 7/2019 |
| CN | 110837393 A | 2/2020 |
| CN | 111596945 A | 8/2020 |
| CN | 112328293 A | 2/2021 |
| TW | I721003 B | 3/2021 |

OTHER PUBLICATIONS

Bo: "Research and system implementation of over-the-air firmware upgrade technology for IoT devices"; Zhejiang University; copyright 1998-2024; pp. 1-8.
Teraoka, et al.: "Incremental update method for resource-constrained invehicle ECUs"; 2016 IEEE 5th Global Conference on Consumer Electronics; pp. 1-2.
Kachman, et al.: "Efficient Patch Module for Single-bank or Dual-bank Firmware Updates for Embedded Devices"; 978-1-7281-9938-2/20/$31.00 @ 2020 IEEE; pp. 1-6.
"Is your remote upgrade still upgrading the entire APP?"; ZLG Zhiyuan Electronics Nov. 19, 2020; https://baijiahao.baidu.com/s?id=1683780827327274446; pp. 1-14.

* cited by examiner

METHOD AND EQUIPMENT FOR GENERATING A DIFFERENTIAL UPGRADE PACKAGE, AND METHOD FOR UPGRADE

CROSS REFERENCE TO RELATED APPLICATION

This application claims the priority benefit of Chinese Patent Application Serial Number 202111001554.X, filed on Aug. 30, 2021, the full disclosure of which is incorporated herein by reference.

BACKGROUND

Technical Field

The invention relates to method for upgrading firmware in an embedded system, and in particular, to a method for generating a differential upgrade package for an embedded system with limited memory capacity to upgrade the firmware in a per-block fashion.

Related Art

Conventional embedded systems are generally devices with limited computing power and memory capacity. When the firmware needs to be upgraded, the upgrade is performed with a whole package or a differential approach. The advantage of processing a whole package is that the old firmware data is not required and can be directly overwritten with an updated version of file. The differential upgrade method is also called an incremental upgrade. An upgrade package only carries data of discrepant data portions. The data portions containing data consistent to the old firmware is not included in the upgrade package, so the file size of the upgrade package can be significantly reduced. The differential upgrade package is usually generated by high-level equipment with relatively rich memory capacity, and then transmitted to the embedded system for upgrade. The high-level equipment usually refers to the production equipment of embedded system, cloud server or desktop computer. The embedded system can be low-end small program-controlled equipment, such as a gateway, an Internet of things device, a router, and etc. For the embedded systems, due to limited memory capacity, it may be difficult to manage the whole differential upgrade package. To adapt to the limited memory device capacity, a differential upgrade package can be divided into multiple blocks to be written in batches. The upgrade package may be implemented in a differential form to optimize the upgrade package size. The conventional approach reduces the amount of data to be carried by the commands of data movement and data deletion. However, the addition of data cannot be reduced. Therefore, the size of an upgrade package is mainly affected by the amount of data additions. When a plurality of differential data portions are respectively written into multiple blocks, due to lack of global block distribution information, some of the reusable data portions in the original file of the firmware may be undesirably overwritten. Therefore, when generating a differential upgrade package, there may be overheads caused by carrying extra data portions already existed in the original file, rendering the generated differential upgrade package fat and unoptimized.

It is therefore desirable to develop a method for generating a differential upgrade package optimized for low end embedded systems.

SUMMARY

To fully duplicate a new file in the firmware of the embedded system, an embodiment of the application takes the content difference between the original file and the new file into consideration when generating the differential upgrade package, and also considers the capacity of the embedded system, so as to maximize the reuse rate of the effective data in the original file, and to assure a successful upgrade.

To solve the issue in the conventional art, an embodiment of the application proposes a method for generating a differential upgrade package, adaptable for upgrading a firmware of an embedded system with the differential upgrade package. Firstly, in a differential upgrade package generation equipment, a differential comparison is performed on an original file and a new file to generate global discrepancy information, comprising addresses and lengths of matched data portions in the new file and the original file. Thereafter, based on the global discrepancy information, the new file is divided into a plurality of blocks, and patch parameters for each of the blocks are determined. Based on the patch parameters, differential comparisons are performed on each of the blocks and the original file to generate a plurality of differential blocks respectively corresponding to each of the blocks. In the end, the differential upgrade package generation equipment combines the differential blocks into the differential upgrade package, allowing the embedded system to sequentially load each of the differential blocks from the differential upgrade package to upgrade the firmware.

If the new file and the original file are of varied sizes, a smaller one among the new file and the original file is padded with predetermined data bytes on its tail to equalize sizes of the new file and the original file.

When the differential comparison on each of the blocks and the original file finds a matched block, the matched block is marked as no need upgrade; and When the differential comparison on each of the blocks and the original file finds a mismatched block, the mismatched block is marked as pending for upgrade.

In a specific embodiment, each patch parameter comprises: a start address to process, a sequential order to process, and a direction to process.

When determining the patch parameters of the blocks, the sequential order to process and the direction to process are determined based on data portions to be added, data portions to be deleted, and data portions to keep in the original file. That is, the embodiment proposes a mechanism assuring that the reusable data portions in the original file is not overwritten through proper arrangements of the sequential order to process, and the direction to process.

In a further embodiment, when performing the differential comparison on each block of the original file based on the patch parameters, the differential block is generated from the start address based on the sequential order to process and the direction to process of the block.

A plurality of differential blocks are respectively generated from the blocks. They are then compressed and merged to into the differential upgrade package according to the sequential order to process.

In a further embodiment, when generating differential blocks corresponding to each block, the original file may be updated by writing each block into a corresponding location of the original file. When the updated original file is consistent with the new file, it is concluded that the differential upgrade package is generated.

In a further embodiment, each of the differential block may comprise at least one of the following: a command to delete data, and a command to add data executable by the embedded system when performing the upgrade. The command to delete data may comprise a start address and a length of the data to be deleted. Likewise, the command to add data may comprise a start address and the data to be added.

Each of the differential blocks may further comprise a command to move data, allowing the embedded system to move existed data portions in the firmware when performing the upgrade.

A further embodiment of the application proposes a differential upgrade package generation equipment, adaptable for generating a differential upgrade package, allowing an embedded system to read the differential upgrade package in a per-block fashion to upgrade an original file in a firmware of the embedded system to a new file. The differential upgrade package generation equipment comprises a storage device, a memory device, and a processor. The storage device stores a program code executable to perform the method for generating a differential upgrade package. The memory device is connected to the storage device for use by the program code. The processor is connected to the memory device and the storage device, configured to execute the program code to generate the differential upgrade package.

Another aspect of the application proposes a method for upgrade, adaptable for an embedded system to upgrade a firmware. Firstly, a differential upgrade package generated in the aforementioned embodiments is received. The embedded system sequentially reads each of the differential blocks in the differential upgrade package, and each of the patch parameters, respectively. The firmware in the embedded system is upgraded in a per-block fashion based on each of the patch parameters, wherein each patch parameter comprises a start address to process, a sequential order to process, and a direction to process.

The embodiments in the application feature the following advantages. When the differential upgrade package is generated, the sequential order and the direction to process for each block are properly arranged, which effectively prevents any kind of conflictions during the execution of differential upgrade, and allows the embedded system with limited memory capacity to seamlessly accomplish the firmware upgrade without high end hardware requirements. The differential upgrade package is read and processed block by block, thus, the process is efficient and reduces the cost to improve hardware.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include," "contain," and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

In the following embodiment, the same reference numerals are used to refer to the same or similar elements throughout the invention.

Figure 1:
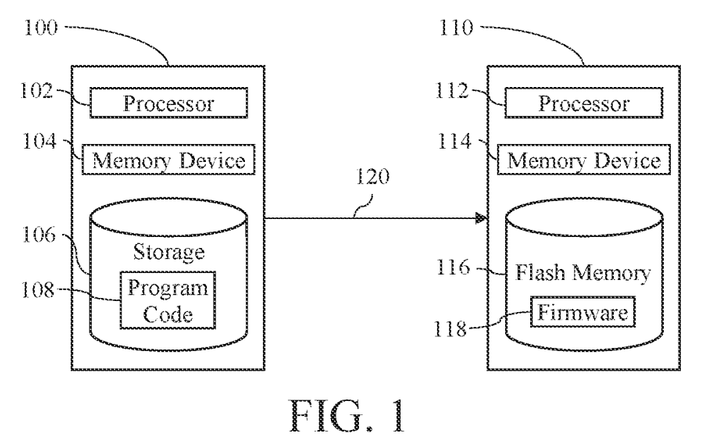
FIG. 1 shows a differential upgrade package generation equipment and an embedded system according to an embodiment of the application.

FIG. 1 shows a differential upgrade package generation equipment 100 and embedded system 110 according to an embodiment of the present application. The differential upgrade package generation equipment 100 can generally be the equipment on the production line or a desktop computer provided by the user, which can also be referred to as the high-level equipment herein. An upgrade package 120 is generated in the differential upgrade package generation equipment 100, and then transmitted to the embedded system 110 through the network or various storage media. The differential upgrade package generation equipment 100 basically includes a storage device 106 for storing a program code 108. The program code 108 can be loaded into the memory device 104. After being executed by the processor 102, the upgrade package 120 is generated according to the method for generating a differential upgrade package described in the embodiment of this specification. The embedded system 110 can be any common smart home appliance in life, such as an Internet of things (IOT) device, a router, or a gateway. It basically includes a flash memory 116, which can store the firmware 118, allowing a processor 112 and a memory device 114 to load and execute the functions in the firmware 118 to realize basic operations of embedded system 110. Since the flash memory 116 is usually rewritable, the service provider can often provide upgrade packages of the firmware 118, i.e., an upgrade package 120, to the embedded system 110 on the user end. In most embedded systems 110, the memory device 114 is a limited resource. Therefore, to upgrade the firmware 118 with the upgrade package 120, data must be separately processed block by block. However, if the upgrade package 120 comes in a format of differential upgrade package, the upgrade procedure performed in a per-block manner may cause the effective data to be overwritten due to the lack of global block distribution information, resulting in incorrect upgrade.

In view of the defects in the conventional approaches, the method for generating a differential upgrade package proposed in the application makes full use of the high-level equipment to analyze the difference information between the original file and the new file and generates a differential upgrade package by blocks arranged in a specific order. The differential upgrade package, also known as patch file, is in a format suitable for the embedded system lacking memory capacity to upgrade its firmware in a block manner. The method proposed in the application receives benefits from light and energy saving as the conventional differential upgrade package and lower costs for hardware requirements.

Figure 2:
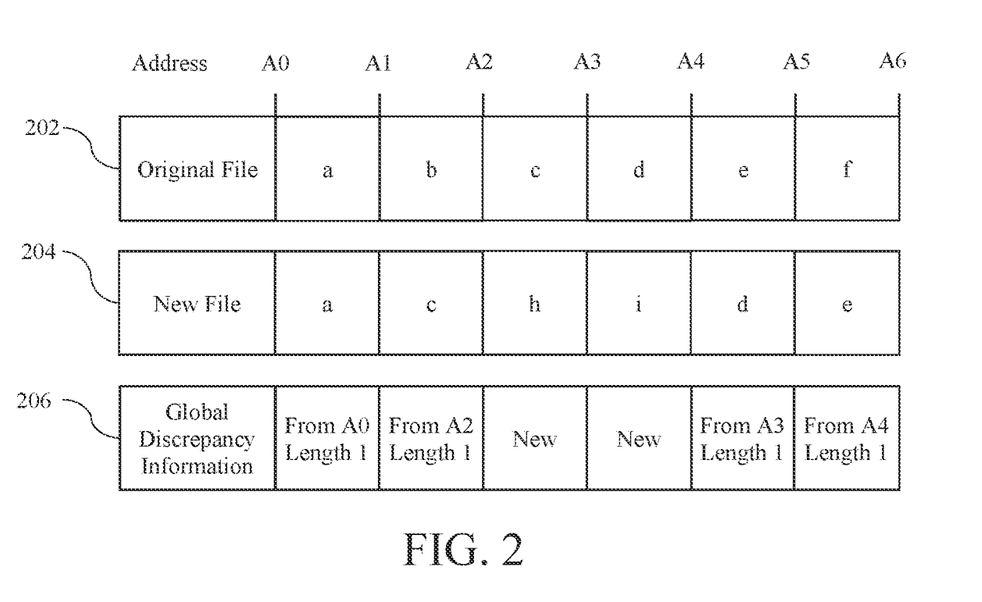
FIG. 2 is a schematic diagram of a global differential comparison on the original file and the new file according to an embodiment of the application.

FIG. 2 is an embodiment of a global differential comparison between the original file and the new file. The original file 202 is stored in a memory device or a flash memory, and the content location are respectively denoted as data portions a, b, c, d, e, and f distributed in addresses A0 to A6. When the new file 204 is provided, the data portions therein are respectively denoted as a, c, h, i, d, and e. After performing a global comparison (differential, diff) on the original file 202 and the new file 204, the global discrepancy information 206 is obtained. A result from the global differential comparison can describe the differences between the original file 202 and the new file 204 in a compact format. For example, the result of the global differential comparison indicates that data portion "b" is deleted in address A1 (b--), new data portions "h" and "j" are added in address A2 (h++, j++), and data portion "f" is deleted in address A5 (f--). In this embodiment, the global discrepancy information 206 can be used to describe matched data portions between the original file 202 and the new file 204. Specifically, the global discrepancy information 206 can be in the form of a mapping table that records start addresses and lengths of each discrepant data portions in the new file and the original file. Taking FIG. 2 as an example, data portions a, c, d, and e in the new file can be related to the original file through a global discrepancy information 206, which also includes information about start addresses and lengths of the corresponding data portions in the original file. With the global discrepancy information 206, the subsequent steps can determine the optimized patch parameters, including sequential orders, start addresses and directions to process each block. According to the sequential order and the direction defined for each block, each block performs a differential comparison with the original file, and a corresponding outcome is referred to as a differential block for short. In the end, the differential blocks are compressed into a file one by one according to the sequential orders, and the file is concluded as a differential upgrade package. For the embedded system, the differential blocks in the differential upgrade package are sequentially read to patch the original file in the firmware, thus the original file is seamlessly turned into a new file.

Figure 3:
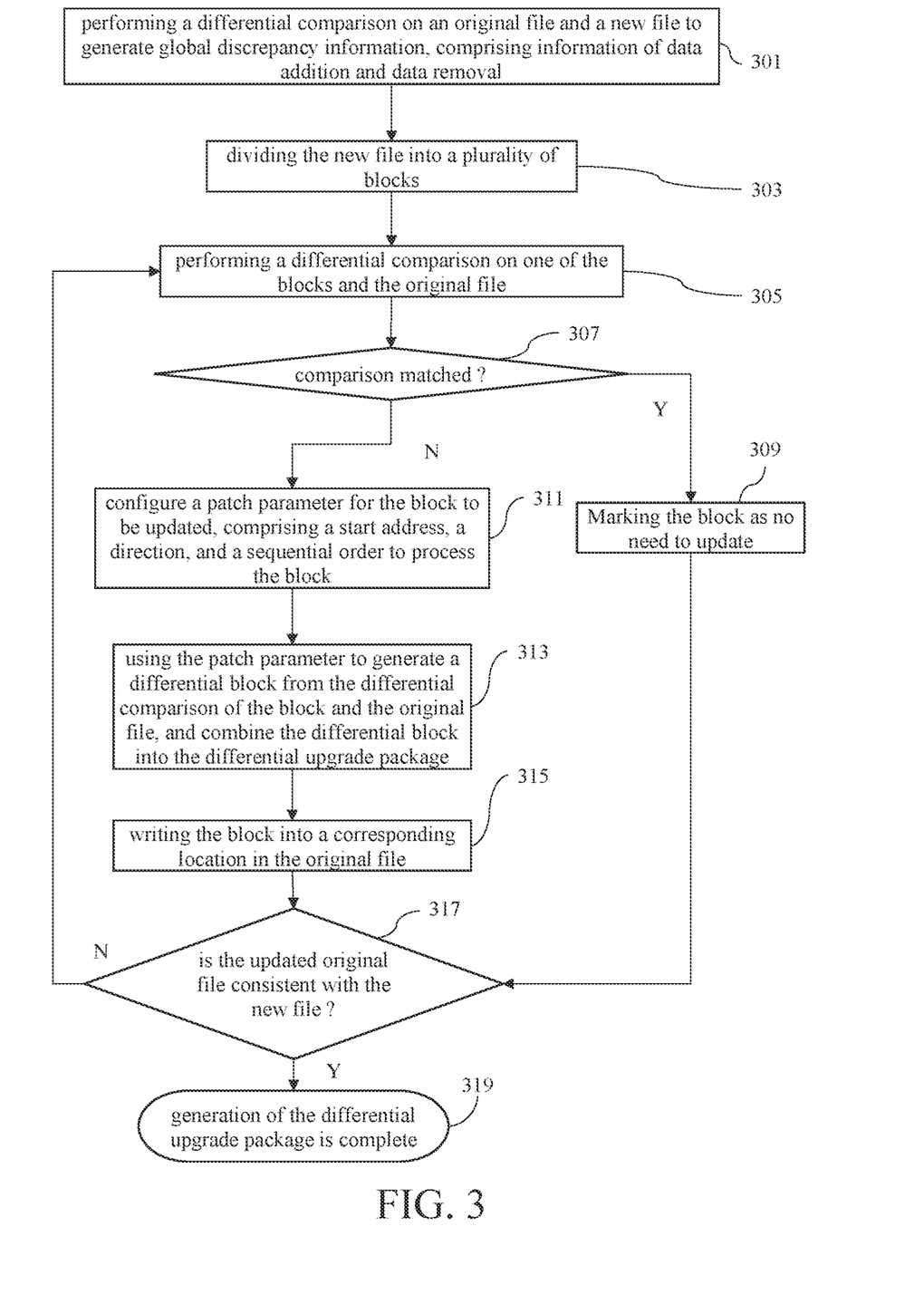
FIG. 3 is a flowchart of the method for generating a differential upgrade package according to an embodiment of the application.

FIG. 3 is a flowchart of the method for generating a differential upgrade package in this application implementation. The specific steps for implementation are as follows.

In step 301, a global discrepancy information 206 is obtained by differential comparing an original file 202 (file to be upgraded) and a new file 204 (target file), including a mapping table of locations and lengths of the target file data to be matched in the file to be upgraded. Generally, a differential comparison renders difference information between two files in a specific format, such as a diff file, including fragments and addresses that are added or deleted from the file. The global discrepancy information 206 of the embodiment is designed to keep addresses and lengths of the target file portions that match the original file to be upgraded in a mapping table to optimize the next steps.

In step 303, the new file 204 is then divided into blocks. If the new file 204 is not the same size as the original file 202, before the block division, data bits 0xFF are padded to the tail of the smaller one of the two files to make them equal in length. The sizes of the blocks can be either fixed or flexible depending on the maximum capacity can be managed by the embedded systems per time. For example, a block can be one fixed address segment, such as a 4K, 8K, 16K bit block. The size of the blocks can also be programmatically arranged, such as configuring several consecutive difference fragments in the new file 204 discrepant from the original file 202 as a block. As for the same fragments in both files, although no updates are required, they are usually affected by new and deleted fragments and must be moved. Therefore, they can also be processed in the form of a block in the subsequent steps.

In step 305, an iteratively executed procedure is started to compare each block divided from the new file 204 one by one with the original file 202. Steps 307 to 315 therefore describe each of the blocks processed as "the block".

In step 307, the block is compared with a corresponding location in the original file 202. If the contents compared are consistent, the block is marked in step 309 as no update, and the procedure goes directly to step 317. In contrast, the block with inconsistent content is represented as a block pending for upgrade. Each block pending for upgrade represents a corresponding fragment in the new file 204. Subsequent steps 311 to 315 are executed to progressively generate the differential upgrade package from all the blocks pending for upgrade.

In step 311, following the global discrepancy information 206 obtained in step 301, patch parameters are derived for generating the differential upgrade package. Each patch parameter defines a start address, a direction, and a sequential order to process one of the blocks pending for upgrade. When deriving a patch parameter for a block, the sequential order to process the block and the direction to process the block can be determined based on the matched portion in the original file and the new file. By defining the sequential order to process the block and the direction to process the block, the embodiment is advantageous for being able to ensure that a matched portion of the original file is preserved without being overwritten.

The start address of the discrepant portion is an entry point in the original file where a block pending for upgrade is updated. Each of the discrepant portions in the original file has a different start address.

The direction to process for each block pending for upgrade can be forward, that is, a differential comparison is performed from a low address to a high address. The direction can be reverse, that is, the differential comparison is performed from a high address to a low address. Considering that the changes from the original file to the new file may include data additions and deletions, and the two actions may cause the rest data to move forward or backward. If the differential upgrade is consistently processed in a same direction, either forward or backward, it is likely to wipe out many original data portions that are still needed in the new file, rendering unwanted overheads to prepare the differential upgrade package. The embodiment makes full use of the global discrepancy information 206 to flexibly determine the direction to process each block pending for upgrade. For example, in the patching process, an original data portion at a certain location in the target firmware may need to be moved first to make room for a new data portion to be written. Therefore, in the process of updating each block pending for upgrade, there are some cases where forward updates can satisfy the order of first moving and then writing, and other cases where reverse updates are appropriate. This flexible configuration reduces the loss of the original data, which in turn reduces the amount of data that needs to be carried in the differential upgrade package.

The sequential orders to process the blocks pending for upgrade can be a sequence in which all blocks pending for upgrade are processed during the generation of a differential upgrade package. The principle to arrange the sequence is similar to determination of the directions to process each block except that the global situation is further considered as explained hereafter.

In step 313, a differential comparison is performed on the block and a corresponding portion of the original file according to the patch parameter, such that a differential block is generated, compressed, and appended to the differential upgrade package. In other words, multiple blocks pending for upgrade can result in multiple differential blocks by comparing with the original file in a sequential order. The differential blocks are compressed and merged into the differential upgrade package.

In step 315, after each differential block is generated, for a simulation purpose, the data content in the corresponding location of the original file can also be replaced with the contents of the block pending for upgrade.

In step 317, it is determined whether the original file 202 is identical to the new file 204 after updated by the blocks pending for upgrade. If not, repeat step 305. The process runs repetitively for all blocks pending for upgrade until the original file is eventually identical to the new file, and thereby the differential upgrade package is deemed complete in step 319.

The differential upgrade package can be in a compressed format, such as zip. In addition to the differential block corresponding to each block pending for upgrade, the differential upgrade package can also include start addresses of discrepant portions corresponding to each block pending for upgrade, and the direction to process each block pending for upgrade.

The resulting differential upgrade package allows the embedded system of limited memory capacity to break down a differential upgrade process into multiple differential patch processes, such that the new file is rebuilt in the firmware of the embedded system from the original file block by block. The embodiment is also advantageous for being able to effectively preserve reusable data portions which on the other hand might be wiped out in the conventional update process.

Figure 4:
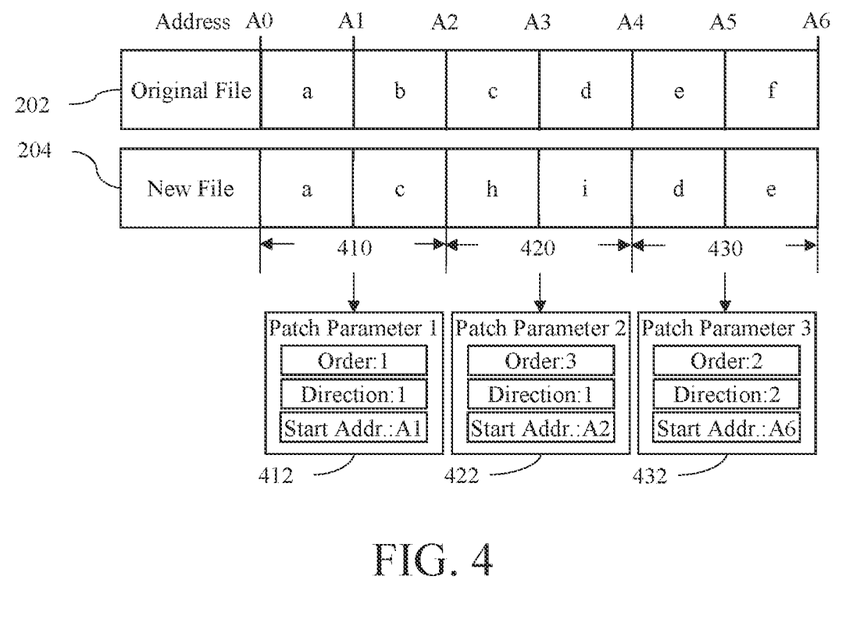
FIG. 4 shows a process of dividing the new file into blocks and determining the patch parameters according to an embodiment of the application.

FIG. 4 illustrates a procedure to divide the new file and determine the patch parameters. As in step 303, the, the new file 204 is divided into three blocks 410, 420, and 430. The patch parameters 412, 422, and 432 of these blocks are generated according to the global discrepancy information 206 of the original file 202 and the new file 204. From the block 410, the data portion "a" remains unchanged and the data portion "b" becomes "c". In other words, the data portion "b" is deleted and no longer required by other parts of the new file 204. Therefore, the sequential order to process the block 410 can be confidently scheduled to 1, with a processing direction from the start address A1 to the right. For ease of description, in the embodiment, the number 1 represents the right direction, and the number 2 represents the left direction. By analyzing the changes between the original file 202 and the new file 204 in the block 420, it is observed that the data portion "c" becomes "h", and the data portion "d" becomes "i". The data portion "d," however, cannot be deleted at this stage because its content is reusable elsewhere in the new file 204. Therefore, the sequential order to process of the block 420 is deferred and the patch parameter of the other blocks is determined first. Thereafter, when the block 430 is analyzed, it is determined that the data portion "e" will become "d" and the data portion "f" will become "e". This scenario is suitable for starting from the address A6 of the original file 202 in a reverse direction (to the left) to overwrite the data portion "f" of the original file 202 with the data portion "e" before filling the data portion "d" into the original position of the portion "e". Therefore, in this case, the patch parameter 432 defines a sequential order 2, a direction to process 2 (reverse), and a start address A6.

In general differential comparisons, data differences between two files can be categorized into several cases: new, deleted, or unchanged. The addition of data at a location on the original file literally renders the subsequent data to shift toward the end of file. In contrast, deletion of data necessitates that the subsequent data after the corresponding location are shifted toward the head of file. As for the unchanged data, also known as raw valid data, there are most likely to be shifted during the differential upgrade process due to the effects of data addition and deletion. Therefore, the unchanged data can further be divided into mobile and non-mobile scenarios.

In an embodiment of the application, the following rules may be considered when determining the patch parameters. First, the data portions deleted from the blocks are prioritized to be processed, creating rooms facilitating the scheduling of subsequent data additions and movements. Then, as far as possible, arrange to move the original reusable data to their corresponding destination location when their destination location is free space. By data movement, it is referred to as combined actions including copying the data to a new location and deleting the data at the old location. Since the original reusable data already exists in the original file, this step does not require a differential upgrade package to provide the data payload. What are required are just the old and new addresses of the original reusable data. For example, a move command can be recorded in the differential upgrade package to indicate the original start address, the new start address, and the size of each piece of reusable data that needs to be moved.

When calculating the direction and the sequential order of the patch parameter, considering that the embedded system to be upgraded may have limited firmware capacity, it is preferable to prepare more space in advance to improve the processing efficiency. Thus, the algorithm may prefer to prioritize the processes related to data deletion and movements. The blocks associated with the new data portion additions are arranged thereafter.

The proposed embodiment can maximize the reuse of the original data and reduce unnecessary data loss. However, the above calculating principles are only one of many possible implementations, and the actual implementation of program code is not limited in this application. In addition, the process of implementing program code may encounter many exceptions to be managed. For example, in the process of deriving the direction and sequential order of the patch parameter, a deadlock may be introduced, where multiple data portions in the process have cross-dependencies to move, add, and delete from each other at the same time. There is a possibility that data portions "a" and "b" will swap places, but each is waiting for the other to move. Consequently, the deadlock can never be released without third party interventions. Therefore, when an instance like a deadlock is occurred, one solution is to append needed data portions in the differential upgrade package to allow the patch process smooth.

Figure 5A:
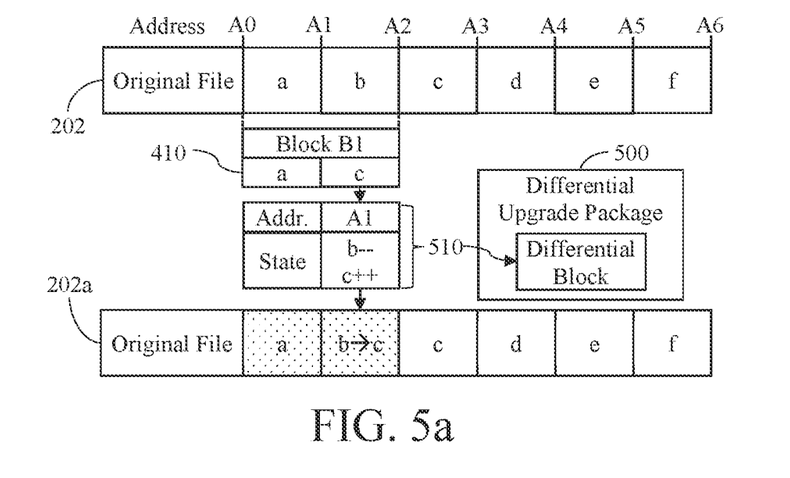
FIG. 5a to 5c shows a process of generating the differential upgrade package according to an embodiment of the application.
Figure 5B:
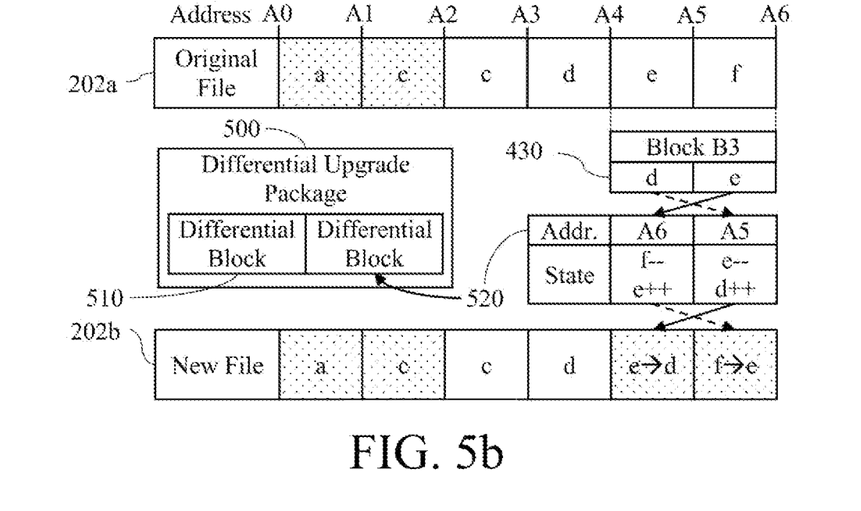
Figure 5C:
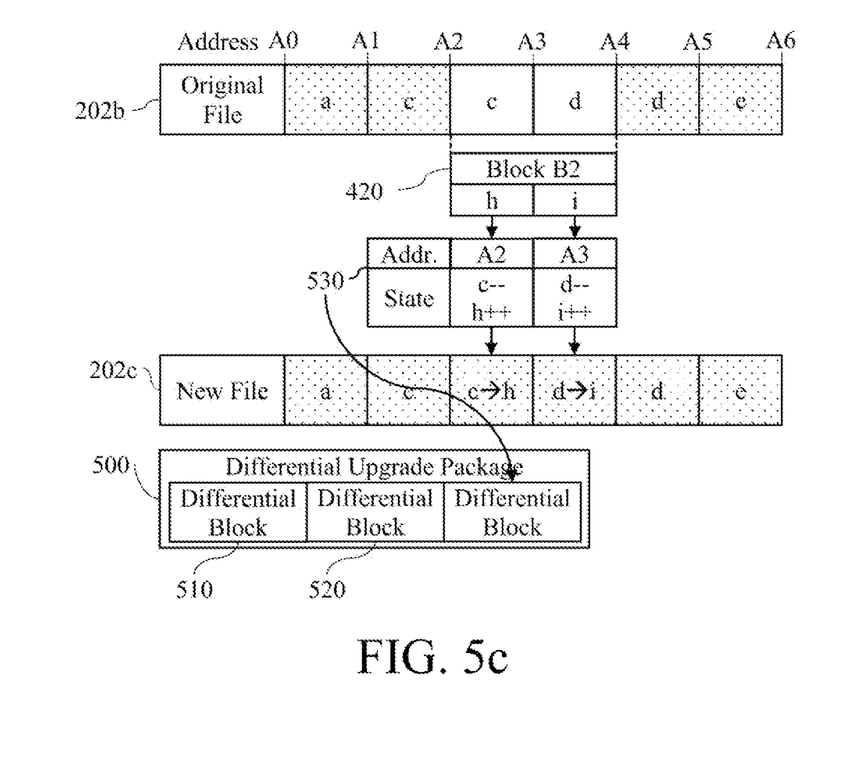

FIGS. 5a to 5c are examples of this application for generating differential blocks. Based on the operational principles defined by the patch parameters 412, 422, and 432, differential comparisons are iteratively performed on each block in new file 204 with the original file 202 as described in steps 313 to 317 of FIG. 3, and a differential upgrade package 500 is thereby generated from the resulting differential blocks.

FIG. 5a shows an embodiment of a differential block 510 generated by the block 410. According to the patch parameter 412, the block 410 is in the first order to be processed. A differential comparison performed on the block 410 and the original file 202 renders a differential block 510, wherein a start address is A1, actions needed are to delete the data portion "b" (b−−) and add the data portion "c" (c++) to the right. However, as shown from the global discrepancy information 206, the data for data portion "c" already exists in the original file. It is not desirable to create overheads in the differential upgrade package for the existed data that can be reused. Therefore, the differential block 510 is designed to update the data portion "b" of the original file to "c" with just instructions but no data payload. Specifically, the instructions are to delete the data portion "b" and move the data portion "c." The differential block 510 is compressed into differential upgrade package 500 after the differential comparison. For the embedded system 110 as shown in FIG. 1, when the firmware upgrade is performed, the differential block 510 is interpreted to execute actions including a deletion of data portion "b" and a move of data portion "c" at the start address A1. On the other hand, since the directive explicitly states that a data portion "b" starting at address A1 is overwritten by a new data portion "c", the deletion action may not be necessary, and an overwriting action can be directly executed instead. The embodiment can be implemented in such a way that when the differential upgrade package 500 is generated, the global discrepancy information 206 obtained beforehand determines that the data portion "c" originating from address A1 already exists in address A2 to A3 in the original file 202. Therefore, the data payloads of the data portion "c" is not included into the differential block 510, thus rendering a more compact differential upgrade package.

On the other hand, in step 315 of FIG. 3, after the differential block 510 is generated, the changed data portion in the block 410 can be further updated to the original file 202, turning the original file 202 into an updated original file 202a. As shown in FIG. 5a, the data portion starting from A1 is changed from "b" to "c". The data portion "a" remains unchanged in this case. Gray dots are presented in FIG. 5a to show blocks in the original file 202a that are respectively identical to those in the new file 204.

FIG. 5B shows an embodiment of a differential block 520 generated from the block 430. According to the patch parameter 432, the block 430 is the second block to be processed in sequence. A differential comparison of the block 430 and the original file 202a has found that starting from address A6, actions are required to delete the data portion "f" (f−−) and add a data portion "e" (e++) in a direction toward left. Likewise, starting from address A5, actions are required to delete the data portion "e" (e−−) and add a data portion "d" (d++) in a direction toward left. However, it is observable from the global discrepancy information 206 that the data portions "d" and "e" already exist in the original file which do not rely on the differential upgrade package to provide. The differential block 510 can be designed to update the data portions "e" and "f" of the original file to "d" and "e" with just instructions but no data payloads. The differential block 520 is compressed and appended into the differential upgrade package 500 which comprises the differential block 510. For the embedded system 110 shown in FIG. 1, when the update is performed, it will interpret the differential block 520 to process the upgrade from address A6 to address A5 in a direction toward left (reversely). The first action is to delete the data portion "f" between addresses A5 to A6, and then move the data portion "e" from address A4 thereto. Secondly, the data portion "e" between addresses A4 to A5 is rewritten with data portion "d" moved from the block at address A3 to A4. As explained in FIG. 5a, the delete action is optional when the block is to be overwritten with new data. In the case of FIG. 5b, data portions "d" and "e" are reused by movements, and no data addition is required. Therefore, the differential upgrade package 500 do not need to carry data portions "d" and "e", so as to improve the upgrade efficiency.

Likewise, as described in step 315 of FIG. 3, after a differential block 520 is generated, changes found in the block 430 can be further updated into the original file 202a, turning the original file 202a into an updated original file 202b. As shown in FIG. 5b, the data portion "e" at address A5 becomes "d", and the data portion "f" at address A6 becomes "e". Identical data portions in the original file 202b and new file 204 are represented by grey dots. As can be seen in FIG. 5b, two-thirds of the data portions have been processed.

FIG. 5C shows an example of generating a differential block 530 from the block 420. According to the patch parameter 422, the block 420 is the third block to be processed in sequence. A differential comparison on the block 420 and the original file 202b shows that starting from address A2, a deletion of data portion "c" (c−−) and an addition of data portion "h" (h++) are required in a direction to the right (forward). Likewise, starting from address A3, the data portion "d" id to be deleted (d--), and the data portion "i" is to be added (i++) in a direction to the right. From the global discrepancy information 206, data portions "h" and "i" are newly added data that must be carried through the differential block 530. Therefore, the differential block 530 is compiled to carry the data portions "h" and "i", which is then compressed into the differential upgrade package 500, appended after the differential block 510 and 520. For the embedded system 110 as shown in FIG. 1, when the update is performed, the differential block 530 is interpreted to perform corresponding actions, including deleting the data portion "c", and adding the data portion "h" at address A2 in a direction to the right. Likewise, data portion "d" is deleted at the address A3 where the data portion "i" is then written thereto. As explained in FIGS. 5a and 5b, the deletion action can be skipped if the address will be filled with new data.

On the other hand, in step 315 of FIG. 3, after the differential block 530 is generated, the contents of the block 420 can be further updated to the original file 202b, turning the original file 202b into an updated original file 202c. As shown in FIG. 5c, the data portion "c" starting at A2 becomes "h", and the data portion "d" starting at A3 becomes "i". Identical blocks in the original file 202c and the new file 204 are shown in grey dots. FIG. 5c shows that all block updates have been commenced, and the differential upgrade package 500 is completely generated, ready for the embedded system 110 to perform a differential upgrade.

To sum up, a calculation program code can be provided based on the described algorithm to derive the patch parameters. In addition to the start addresses, sequential orders, and directions to process each block, a movement command can also be included to move the original reusable data. The embodiment prevents the original reusable data from lost and generates an optimized differential upgrade package for the embedded system with low hardware capabilities to efficiently upgrade its firmware in a per-block manner.

In a further embodiment, a method for upgrade is proposed to enable an embedded system to upgrade firmware using the optimized differential upgrade package as described in the aforementioned embodiments. Each differential block in the differential upgrade package is loaded one by one by the embedded system to be upgraded. The firmware is then upgraded block by block according to the corresponding patch parameters. For example, the optimized differential upgrade package may provide multiple blocks corresponding to a new file, which are generated in accordance with a sequential order to process. The differential blocks are sequentially loaded and executed block by block according to the parameters such as the direction to process and the start address, and in the end the firmware can be correctly upgraded. Detailed processes of upgrading the firmware are similar to the process to update the original file 202a, 202b, and 202c in FIGS. 5a to 5c. The differential upgrade package optimization method proposed in this application can minimize the need to carry reusable data portions, and the method for upgrade is especially adaptable for computer systems with low-end hardware specifications.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method for generating a differential upgrade package, adaptable for upgrading a firmware of an embedded system, comprising:

performing a differential comparison on an original file and a new file to generate global discrepancy information comprising addresses and lengths of matched data portions between the new file and the original file; based on the global discrepancy information, dividing the new file into a plurality of blocks, and determining patch parameters for each block of the plurality of blocks; based on the patch parameters, performing differential comparisons on each of the plurality of blocks in the original file to generate a plurality of differential blocks respectively corresponding to each block of the plurality of blocks; and combining the differential blocks into the differential upgrade package, wherein the embedded system sequentially loads each of the differential blocks from the differential upgrade package to upgrade the firmware;

wherein the patch parameters for each block comprises a start address, a direction, and a sequential order to process the each of the differential blocks, wherein the direction of at least one of the differential blocks is a forward direction and the direction of at least one of the differencial blocks is a reverse direction, wherein the forward direction indicates processing a block of the each of the differential blocks from a low address to a high address and the reverse direction specifies processing the block of the each of the differential blocks from the high address to the low address.

2. The method as claimed in claim 1, further comprising: if the new file and the original file are of varied sizes, padding a tail of a smaller one among the new file and the original file with predetermined data bytes to equalize sizes of the new file and the original file.

3. The method as claimed in claim 1, further comprising: when the differential comparison on each of the blocks and the original file finds a matched block, the matched block is marked as no need upgrade; and when the differential comparison on each of the blocks and the original file finds a mismatched block, the mismatched block is marked as pending for upgrade.

4. The method as claimed in claim 1, wherein when determining the patch parameters of the blocks, determining the sequential order to process and the direction to process based on data portions to be added, data portions to be deleted, and data portions to keep in the original file.

5. The method as claimed in claim 1, wherein the step of performing the differential comparison on each block of the original file based on the patch parameters comprises: generating the differential block starting from the start address based on the sequential order to process and the direction to process of the block.

6. The method as claimed in claim 5, wherein the step of combining the differential blocks into the differential upgrade package comprises: compressing and merging a plurality of differential blocks respectively generated from the blocks into the differential upgrade package according to the sequential order to process.

7. The method as claimed in claim 1, the step of generating differential blocks corresponding to each block comprises: updating the original file by writing each block into a corresponding location of the original file; and concluding that the differential upgrade package is generated when the updated original file is consistent with the new file.

8. A differential upgrade package generation equipment, adaptable for generating a differential upgrade package, allowing an embedded system to read the differential upgrade package in a per-block fashion to upgrade an original file in a firmware of the embedded system to a new file, comprising:
- a storage device, storing a program code executable to perform the method for generating a differential upgrade package; a memory device, coupled to the storage device for use by the program code; and
- a processor, coupled to the memory device and the storage device, configured to execute the program code to generate the differential upgrade package;
- wherein: the processor executes the program code to perform a differential comparison on the original file and the new file to generate global discrepancy information, comprising addresses and lengths of matched data portions in the new file and the original file;
- based on the global discrepancy information, the processor divides the new file into a plurality of blocks, and determines patch parameters for each of the blocks; based on the patch parameters, the processor performs differential comparisons on each of the plurality of blocks in the original file to generate a plurality of differential blocks respectively corresponding to each block of the plurality of blocks; and
- the processor combines the differential blocks into the differential upgrade package wherein each of the differential blocks from the differential upgrade package is sequentially loaded to the upgrade firmware;
- wherein the patch parameters for each block comprises a start address, a direction, and a sequential order to process the each of the differential blocks,
- wherein the direction of at least one of the differencial blocks is a forward direction and the direction of at least one of the differential blocks is a reverse direction, wherein the forward direction indicates processing a block of the each of the differential blocks from a low address to a high address and the reverse direction specifies processing the block of the each of the differential blocks from the high address to the low address.

9. A method for upgrading firmware in an embedded system, comprising: receiving a differential upgrade package generated from a differential upgrade package generation equipment; sequentially reading each of the differential blocks in the differential upgrade package, and each of the patch parameters respectively; and upgrading the firmware in a per-block fashion based on each of the patch parameters; wherein the differential upgrade package is generated comprises the steps of: performing a differential comparison based on an original file and a new file to generate global discrepancy information, comprising addresses and lengths of matched data portions in the new file and the original file;
based on the global discrepancy information, dividing the new file into a plurality of blocks, with patch parameters for each of the blocks determined; based on the patch parameters, performing differential comparisons on each of the blocks in the original file to generate a plurality of differential blocks respectively corresponding to each block of the plurality of blocks; and
combining the differential blocks into the differential upgrade package; wherein the patch parameters for each block comprises a start address, a direction, and a sequential order to process the each of the differential blocks,
wherein the direction of at least one of the differencial blocks is a forward direction and the direction of at least one of the differential blocks is a reverse direction, wherein the forward direction indicates processing a block of the each of the differential blocks from a low address to a high address and the reverse direction specifies processing the block of the each of the differential blocks from the high address to the low address.

10. The method as claimed in claim 9, wherein if the new file and the original file are of varied sizes, padding a tail of a smaller one among the new file and the original file with predetermined data bytes to equalize sizes of the new file and the original file.

11. The method as claimed in claim 9, the differential upgrade package is generated further comprising: when the differential comparison on each of the blocks and the original file finds a matched block, the matched block is marked as no need upgrade; and when the differential comparison on each of the blocks and the original file finds a mismatched block, the mismatched block is marked as pending for upgrade.

12. The method as claimed in claim 9, wherein when determining the patch parameters of the blocks, determining the sequential order to process and the direction to process based on data portions to be added, data portions to be deleted, and data portions to keep in the original file.

13. The method as claimed in claim 9, wherein the step of performing the differential comparison on each block of the original file based on the patch parameters comprises: generating the differential block starting from the start address based on the sequential order to process and the direction to process of the block.

14. The method as claimed in claim 13, wherein the step of combining the differential blocks into the differential upgrade package comprises: compressing and merging a plurality of differential blocks respectively generated from the blocks into the differential upgrade package according to the sequential order to process.

15. The method as claimed in claim 9, the step of generating differential blocks corresponding to each block comprises: updating the original file by writing each block into a corresponding location of the original file; and concluding that the differential upgrade package is generated when the updated original file is consistent with the new file.

* * * * *